UNITED STATES PATENT OFFICE.

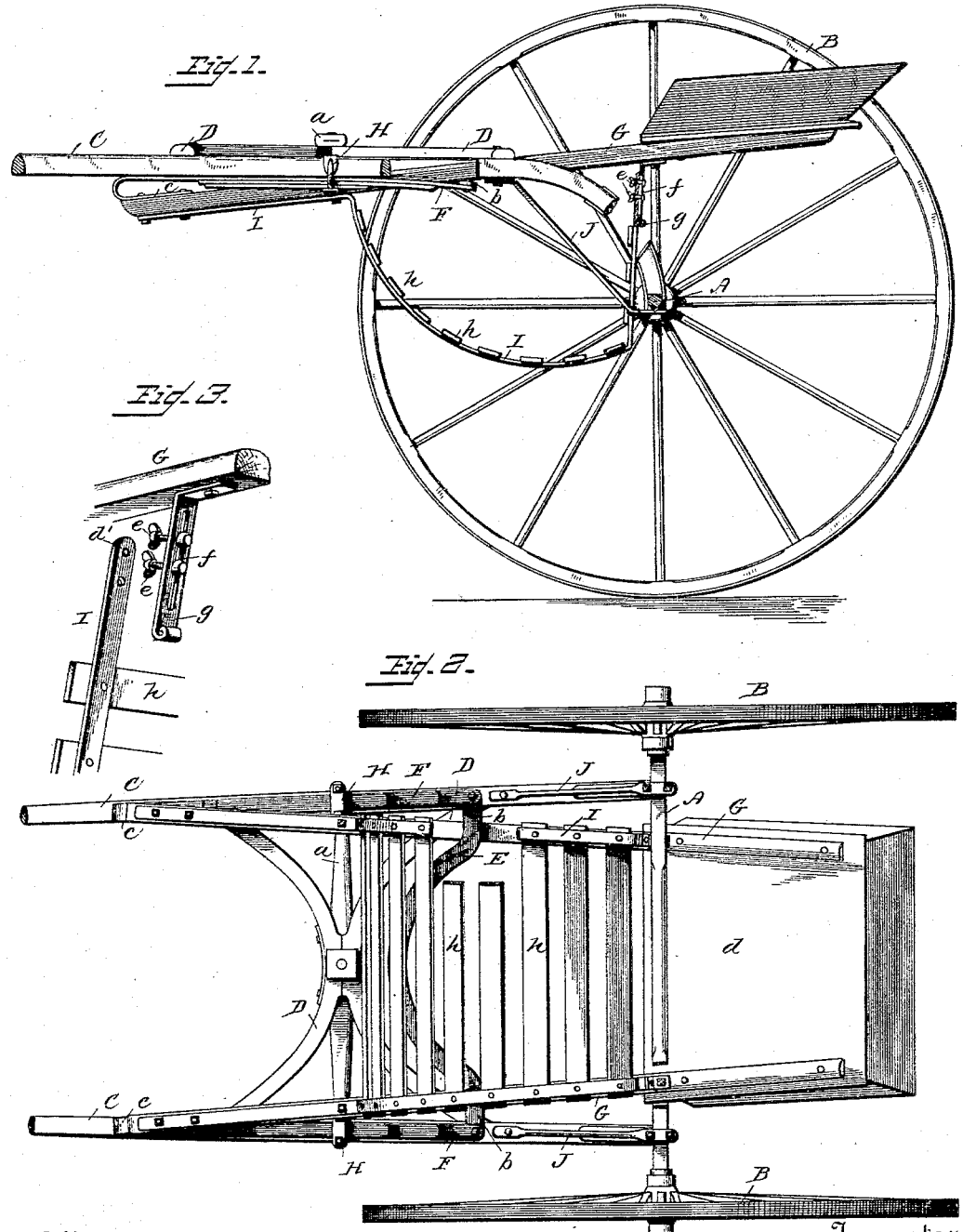

DAVID C. PLANK, OF BRYAN, OHIO, ASSIGNOR OF ONE-HALF TO JOSEPH W. BALL, OF SAME PLACE.

ROAD-CART.

SPECIFICATION forming part of Letters Patent No. 369,362, dated September 6, 1887.

Application filed May 19, 1887. Serial No. 238,751. (No model.)

*To all whom it may concern:*

Be it known that I, DAVID C. PLANK, a citizen of the United States, residing at Bryan, in the county of Williams and State of Ohio, have invented certain new and useful Improvements in Road-Carts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to two-wheeled vehicles, and more especially to that class commonly called "road-carts," and has for its object to improve generally this class of vehicles, to render the same easy riding, and to provide for the adjustment of the supporting-spring to suit the weight in the seat.

To these ends and to such others as the invention may pertain the same consists in the peculiar combination and the novel construction, arrangement, and adaptation of parts, all as more fully hereinafter described, and then specifically pointed out in the claims.

In the accompanying drawings, which form a part of this specification, and in which like letters of reference refer to similar parts throughout the different views, Figure 1 is a side view with one wheel removed. Fig. 2 is a bottom plan, and Fig. 3 is a detail perspective of the means of adjusting the foot-rest.

Referring now to the details of the drawings, A represents the axle, B the wheels, and C the shafts, all of which may be of any approved or well-known construction.

D are curved brace-bars for strengthening the shaft. At their points of junction they are securely bolted together, as shown in Fig. 2, and to the same is pivoted the singletree *a*.

E is a cross-bar spring, composed of two or more leaves of spring-steel arranged beneath the shafts a short distance forward of the axle. This spring is preferably curved or bowed, as shown, so as to give ample room for the legs and knees of the rider and for lap-robes, the straight ends *b* of said spring being attached to the inner ends of the main leaf of the main springs F, which main springs are composed of two or more leaves and extend forward along and underneath the shafts, and at their forward ends are bent in the form of the letter U, the rearwardly-extending arms *c* of which are bolted to the forward ends of the seat-bars G, to the opposite ends of which is secured the seat, which may be of any approved or well-known construction.

H are clips or clevises, which secure the main spring to the shafts substantially in the center of the length of said springs. These clips by means of their bolts and nuts can be readily adjusted longitudinally upon the shafts, and by such adjustment the tension of the springs may be regulated to correspond with the weight to be carried.

The U-shaped portion of the spring F forms an elastic connection between the seat-bars and shafts.

The seat-bars pass between the brace-bars D and the cross-bar spring E, and rest upon said cross-bar spring at about the center of their length.

The foot-rest for the driver is secured to the under side of the seat-bars. It is composed of the bars (preferably iron) I, one end of each of which is secured to the under side of the forward ends of the seat, bent as shown, and the other ends provided with holes *d*, through which pass the thumb-screws *e*, which also pass through the slots *f* in the brackets or strap-irons *g*, which are secured to the under side of the seat-bars directly over the axle. This arrangement provides for the ready adjustment—that is, raising or lowering—of the foot-rest, as the comfort of the occupant or occupants may require. Transverse slats or boards *h* are bolted or riveted or otherwise secured to the bars I.

J are brace or tie rods clipped to the axle at one end, and their other ends secured to the under side of the shafts. These rods serve to strengthen and prevent the springing or straightening of the shafts.

By the construction above described I provide a road-cart that is strong and durable, one that is very easy riding, the cross-bar spring taking off and counteracting the so-called "horse motion," and in which the tension of the spring is readily regulated to suit the varying weights of the occupants of the cart.

Having thus described my invention, what I claim is—

1. The combination, with the shafts, of the cross-bar spring curved as shown, and the seat-bars elastically connected with said shafts and resting upon said spring, substantially as described.

2. The combination, with the shafts and the cross-bar spring, of the seat-bars and the main springs connected at one end with the cross-bar spring and at the other with the forward end of the seat-bars, substantially as described.

3. The combination, with the shafts, the seat-bars, and the cross-bar spring, of the main springs connected at one end to the ends of the cross-bar spring, extended beneath the shafts and terminating at their forward ends in a U-shaped spring connected to the forward ends of the seat-bars, substantially as described.

4. The combination, with the cross-bar spring, the shafts, and the seat-bars, of the main springs connected at one end with said cross-bar spring and at the other with the seat-bars, and the adjustable clips embracing said shafts and main springs, substantially as and for the purpose specified.

5. The combination, with the seat-bars, of the bars I, bent as shown, secured at one end to the forward ends of said seat-bars, and the other provided with holes $d$, the strap-irons $g$, secured to the said bars substantially over the axle and provided with slots $f$, and the thumb-screws $e$, passed through said holes and slots, substantially as and for the purpose specified.

In testimony whereof I affix my signature in presence of two witnesses.

DAVID C. PLANK.

Witnesses:
WILLIAM W. DARBY,
R. L. STARR.